Aug. 3, 1937.    R. J. KRONENBERGER    2,088,603
EGG WRAPPER AND CARTON
Filed Oct. 3, 1935    2 Sheets-Sheet 1
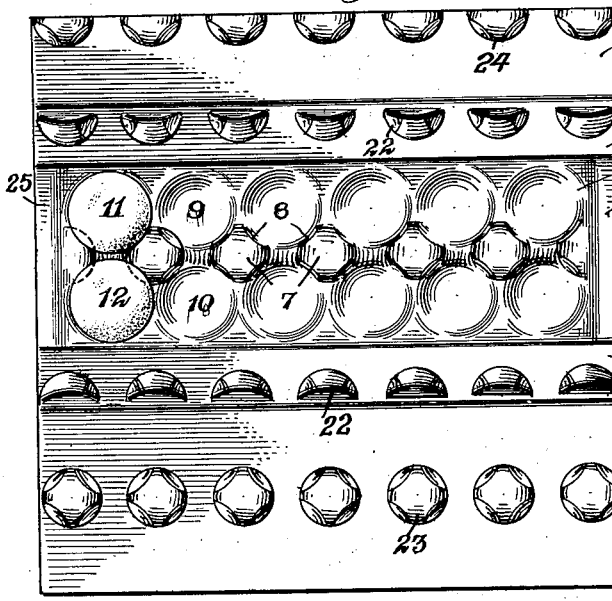
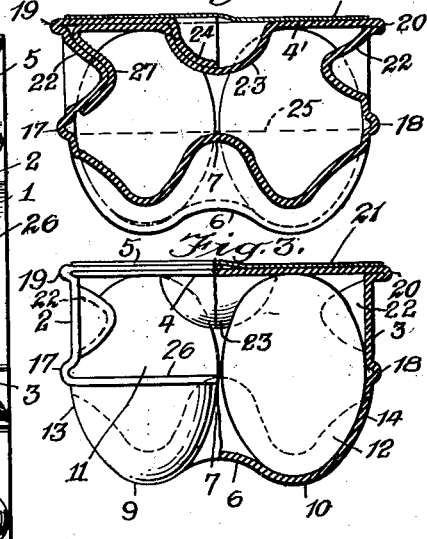
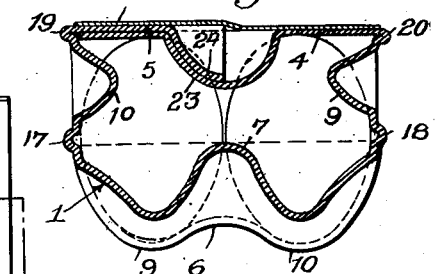
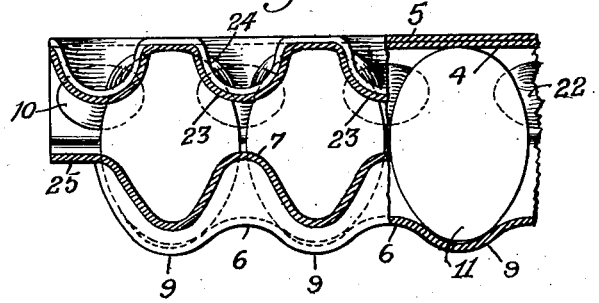
WITNESSES
INVENTOR
Robert J. Kronenberger
BY
ATTORNEYS Aug. 3, 1937.  R. J. KRONENBERGER  2,088,603
EGG WRAPPER AND CARTON
Filed Oct. 3, 1935   2 Sheets-Sheet 2
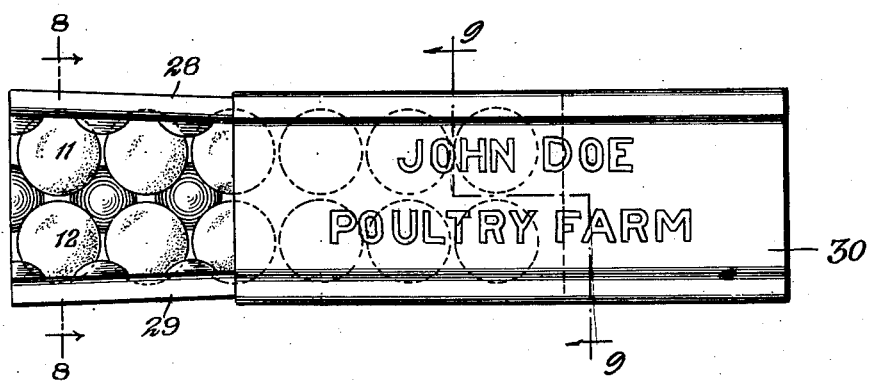
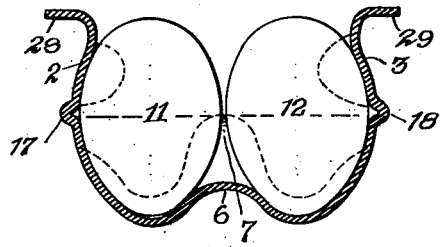
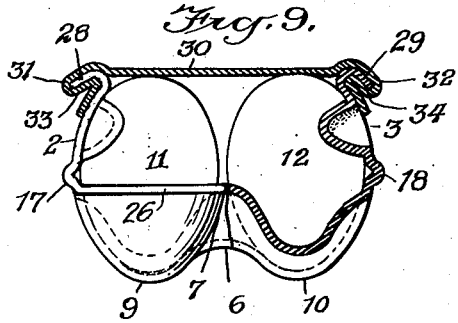
WITNESSES
INVENTOR
Robert J. Kronenberger
BY
ATTORNEYS Patented Aug. 3, 1937

2,088,603

UNITED STATES PATENT OFFICE 2,088,603

EGG WRAPPER AND CARTON

Robert J. Kronenberger, Brooklyn, N. Y.

Application October 3, 1935, Serial No. 43,417

16 Claims. (Cl. 229—29)

This invention relates to an improved egg wrapper or carton, and has for an object to provide a construction for the reception of eggs, wherein the eggs are efficiently protected regardless of whether they are large or small.

Another object of the invention is to provide an egg wrapper or carton made from wood pulp, and molded or otherwise acted upon to produce an enclosure for eggs which will give a yielding but firm protection thereto.

A further object, more specifically, is to provide an egg carrier which may be made out of wood pulp or other pulp and which is formed with sockets and protecting members so arranged that large or small eggs may be properly supported and protected against crushing.

An additional object is to provide an egg carton which may be formed from one or more pieces and which in one form presents overlapping and interlocking top members and in another form a sliding top member.

In the accompanying drawings—

Figure 1 is a plan view of a carton embodying the invention, the same being open and spread out;

Figure 2 is a plan view of the carton shown in Figure 1 after the same has been folded, certain parts being broken away for better illustrating certain detailed structures;

Figure 3 is a sectional view through Figure 2 on line 3—3, the same being on an enlarged scale;

Figure 4 is a sectional view through Figure 2 on line 4—4, the same being on an enlarged scale;

Figure 5 is a fragmentary longitudinal sectional view through Figure 2 on line 5—5, the same being on an enlarged scale;

Figure 6 is a view similar to Figure 4 but showing a slightly modified construction of the invention;

Figure 7 is a plan view of a second modified form of the invention;

Figure 8 is a sectional view through Figure 7 on line 8—8, the same being on an enlarged scale;

Figure 9 is a sectional view through Figure 7 on line 9—9, the same being on an enlarged scale.

Referring to the accompanying drawings by numeral, 1 indicates what may be termed the body of the carton, 2 and 3 the sides, and 4 and 5 the top. As shown in Figure 1, the carton has been formed from wood pulp. In forming the carton of wood pulp, the same may be formed in various ways, but preferably is sucked onto a mold and then later dried, though it could be made by being stamped from a suitable piece of sheet material. As far as the present invention is concerned, it is immaterial what method is used, but in forming the carton or wrapper for eggs, the parts are formed to present the structure shown, for instance, in Figures 1 to 5 inclusive. The body 1 has a bottom portion 6 from which upstand a plurality of egg separators or supports 7. These supports are almost rectangular in cross section but instead of having straight sides they are formed with concave sides 8 into which the respective eggs extend when the device is in use. These supports or protuberances extend up from the bottom and are arranged in a central row thereon as shown in Figure 1. Associated with these protuberances are depressed portions or sockets 9 and 10. The sockets are of course round and somewhat pointed. As illustrated in Figure 3, the respective sockets normally are as indicated by the socket 9. In socket 9 is shown a small egg 11 which does not go to the bottom thereof. However, if a large egg were inserted instead of the small egg, the socket would be deformed slightly to fit the egg, as, for instance, the large egg 12 shown in socket 10. It will be understood that sockets 9 and 10 are identical when the carton is empty but when a large egg is fitted into any socket it assumes the position shown in respect to socket 10 in Figure 3. As shown in Figure 1, there are five protuberances or supports 7 and one-half a support at each end, whereby space is provided for twelve sockets so that twelve eggs may be inserted into the carton. It is of course evident that the carton could be made to receive more eggs or fewer eggs as desired. As indicated in Figure 3, the bottom 6 merges into the upstanding supports 7 and the sockets 9 and 10 and also into inclined side sections 13 and 14 which merge into the sides 2 and 3. Crimped portions 17 and 18 join the sections 13 and 14 with the sides 2 and 3, said crimped portions really forming exterior ribs which act to protect the bellies of the respective eggs. The crimped portions or ribs 17 and 18 also act as hinge members, whereby the sides 2 and 3 may be swung to a position at a right angle to the position shown in Figure 3 when the carton is fully open. Crimps or beads 19 and 20 are also formed at the upper end of the sides 2 and 3 where the sides merge into the top members 4 and 5, which members overlap. By reason of this construction, the top members 4 and 5 may be swung outwardly and also the sides 2 and 3, as illustrated in Figure 1. Preferably the eggs are inserted with the points or small ends downwardly and then the sides and top members in a certain sense wrapped around the edge until the parts assume the position shown in Figure 3. A paster 21 is then applied whereby the top members 4 and 5 are connected together. The carton is then ready to be shipped or otherwise disposed of.

From the sides 2 and 3 upstanding side supports 22 are provided, said side supports being in line with the supports 7. In addition, upstanding top supports 23 are provided in the top flap, said top flap supports being in vertical alinement with the support 7 when the carton is in use, as shown in Figure 3. The top member or flap 5 is provided with half top supports 24 which are adapted to fit into the concave part of the supports 23, as shown in Figure 4 when the device is in use. This provides an interlocking of the respective top members or flaps to hold the carton in assembled relation. It will be understood of course that the paster 21 acts to hold the two top members against disengagement and this paster may be an ordinary strip of paper with any suitable printing matter thereon and secured in place by any suitable form of adhesive. To remove the eggs, it is necessary to break the paster 21 which really acts as a seal for holding the top members together. It will be understood that all of the supporting members are yielding and somewhat resilient so that when pressure is brought to bear thereon, they will yield so as to conform to the particular size and shape of the egg arranged in the carton. In forming the body, the respective ends are provided with end connected bars or sections 25 and 26, which, with the walls of the end sockets, form an end portion for the carton extending upwardly a distance a little less than half the height of the carton, as illustrated particularly in Figure 5. It will be thus seen that the eggs are supported and protected by members on the bottom, members on the sides and members on the top and that at least four of the eggs within the container may be viewed through the ventilating openings provided at the ends of the container between the top and upper edge of the end walls which are separated by the upper extensions of the side walls of the body.

In Figure 6, a slightly modified construction is shown wherein the top member 4' is provided with an extension 27 which fits over the interior surface of the side supports 22. This reinforces the respective parts at this place and provides a better interlocking of the respective parts.

In Figures 7 to 9 inclusive, a modified form of the invention is shown which is constructed identically with the preferred form of the invention except that the top members 4 and 5 are eliminated and merely laterally extending flanges 28 and 29 presented. When the carton is first formed, these flanges extend almost horizontally when the box is resting on a horizontal surface, but when they are interlocking with the slide top 30 they are bent down somewhat, as illustrated in Figure 9. The slide top 30 may be made from cardboard or any desired material and is provided with longitudinal hook members 31 and 32 into which the flanges 28 and 29 fit. The hook members or slides 31 and 32 have portions 33 and 34 fitting between the respective flanges 28 and 29 and the sides 2 and 3 of the carton. Any suitable matter may be printed on the slide top 30 and when this top has been slid fully into position, it will cover the eggs and hold the carton together but will not provide the protecting supports presented in the preferred form of the invention.

I claim:

1. A molded egg holder formed from pulp with a body having bottom, side and end walls, vertical side wall extension members, and a pair of overlapping top members, said side wall extension members rising a substantial distance above their connections with the top edges of the end walls of said body, said top members being hingedly connected respectively to the top edges of said side wall extension members, said body and top members being each formed with inner extending resilient protuberances positioned to act as separating and supporting members for eggs placed in said body.

2. A molded cellular egg holder formed as a one-piece self-sustaining structure with a bottom, integrally connected side and end walls, and a top, each formed with means for supporting and separating eggs placed in the holder, the end walls being connected throughout their heighth to the side walls and the upper edge of an end wall of the holder being disposed a substantial distance below the upper edges of the side walls which support the top.

3. A molded egg holder formed from wood pulp as a one-piece self-sustaining structure with a bottom, vertically connected side and end walls, and a top supported by the side walls in spaced relation to the end walls, the respective bottom, side and end walls, and top being each provided with separating and supporting members for eggs placed in the holder, said bottom, side and end walls being integrally connected and provided with depressed portions adjacent the supporting members therein, said depressed portions presenting sockets arranged so that there will be one socket for each egg, and the end walls being substantially one-half the heighth of the side walls whereby inspection and ventilating openings are provided at each end of the holder.

4. A molded egg carton formed as a one-piece self-sustaining structure with a bottom, vertically connected end and side members, and a pair of top members supported by the side members in spaced relation to the end members, said bottom, end and side members, and top members being each formed with means for supporting and separating eggs placed in the carton, said bottom being also formed with a separate socket for each egg, each of said sockets having a bottom formed normally with a curve thereof having a less radius than the end of the egg positioned therein, and the ends walls and supporting and separating means of said bottom extending substantially half the heighth of the side walls.

5. A molded, self-sustaining cellular holder for eggs and the like formed from wood pulp and as a one-piece structure with a bottom having sockets for receiving eggs and separating members for separating and supporting said eggs, said bottom being formed with end walls merging into a transverse stiffening bar at each end of the holder, and side walls integrally connected with the end walls and extending a substantial distance above the upper edges thereof.

6. An egg carton formed from pulp as a one-piece structure and provided with a bottom, sides, and top, said top comprising a pair of overlapping members, each of said members having inwardly extending protuberances, said protuberances being open to the exterior of the carton, said top being so formed that a protuberance of one overlapping member may fit into the protuberance of the other for locking said overlapping members together, and a paster positioned to connect with said top members for preventing separation thereof.

7. A molded self-sustaining cellular holder for eggs and the like formed with a body and having integrally connected bottom, end and side walls, said body being formed with sockets at the bottom for receiving eggs and inwardly extending protuberances at the bottom and side walls for separating and holding the eggs in said sockets, said side walls extending a substantial distance above the upper edges of the end walls and each having a laterally extending longitudinally positioned flange at its upper edge, and a sliding cover having longitudinal grooves for accommodating said flanges whereby the eggs in the holder are covered and the sides are prevented from moving away from each other.

8. A molded self-sustaining cellular holder for eggs and the like formed with integrally connected bottom, side and end walls for separating and protecting eggs, the side walls of which extend a material distance above their connections with the end walls, and a cover acting to hold the side walls of the holder together with the cover in vertical spaced relation to the end walls.

9. A molded self-sustaining cellular holder for eggs and the like having integrally formed side, end and bottom wall portions and pocket forming division wall portions extending vertically from said bottom wall portion, the said side wall portions extending upward a substantial distance above their connections with said end wall portions, and a top having means connecting the upper end portions of said side walls in vertical spaced relation to said end wall portions.

10. A molded self-sustaining cellular holder for eggs and the like having integrally formed side, end and bottom wall portions and pocket forming division wall portions extending vertically from said bottom wall portion, the said side wall portions extending upward a substantial distance above their connections with said end wall portions and said division wall portions terminating substantially flush with the upper edges of said end wall portions, and a top having means connecting the upper end portions of said side walls in vertical spaced relation to said end and division wall portions.

11. A molded self-sustaining cellular holder for eggs and the like having integrally formed side, end and bottom wall portions and pocket forming division wall portions extending vertically from said bottom wall portion, the said side wall portions extending upward a substantial distance above their connections with said end wall portions, a top having means connecting the upper end portions of said side walls in vertical spaced relation to said end wall portions, and said top having division wall portions arranged to extend in opposed relation to the division wall portion of the bottom wall when in closed position upon said side walls.

12. A molded egg holder formed from pulp comprising a body having integrally formed bottom, side and end walls, vertical side wall extension members and a pair of overlapping top members, said side wall extension members rising a substantial distance above the top edges of the end walls of said body and said top members connecting and bracing the top edge portions of said side wall extension members, and said body and top members being each formed with inwardly extending resilient protuberances positioned to act as separating and supporting members for eggs placed in said body.

13. An egg carton formed from pulp as a one-piece self-sustaining structure and having a bottom, sides and top, said top comprising a pair of overlapping members, each of said members having inwardly extending protuberances, the protuberances being open to the exterior of the carton, and said top being so formed that a protuberance of one overlapping member may fit into the open side of a protuberance of the other for locking said overlapping members together.

14. A molded self-sustaining cellular holder for eggs and the like comprising a body having integrally formed bottom, end and side walls, said body being formed with sockets at the bottom for receiving eggs and inwardly extending protuberances in the bottom and side walls of the body for separating and holding eggs in said sockets, said side walls extending a substantial distance above the upper edges of said end walls and each having a longitudinally extending flange at its upper edge, and a cover having longitudinally extending edge portions for engagement with the flanged edges of the side wall extensions whereby the eggs in the holder are covered and said side extensions are laterally braced and spaced by said top member.

15. A molded self-sustaining cellular holder for eggs and the like formed with integrally connected bottom, side and end wall members for separating and protecting eggs, the side walls of said holder extending a material distance above the upper edges of the end walls, and a cover forming member acting to hold the side walls of the holder in uniformly spaced relation.

16. A molded self-sustaining cellular holder for eggs and the like having integrally formed side, end and bottom wall members and pocket forming division wall portions extending vertically from said bottom wall member, the said side wall members extending upward a substantial distance above the upper edges of said end wall members, a top having means connecting the upper edge portions of said side wall members, and said top having inwardly extending portions arranged in opposed relation to the division wall forming portions of the bottom member when in closed position connecting the upper edge portions of the side wall members.

ROBERT J. KRONENBERGER,